United States Patent Office 3,255,098
Patented June 7, 1966

3,255,098
PHOTOCHEMICAL PREPARATION OF 2,2-CHLOROFLUOROPROPANE
Louis G. Anello, Basking Ridge, and Cyril Woolf, Morristown, N.J., assignors to Allied Chemical Corporation, New York, N.Y., a corporation of New York
No Drawing. Filed June 1, 1962, Ser. No. 199,245
2 Claims. (Cl. 204—163)

This invention relates to processes for manufacture of 2,2-chlorofluoropropane, $CH_3CClFCH_3$, normally a water white liquid having a boiling point of 35.2° C.

2,2-chlorofluoropropane is a known compound, of known utility particularly as an intermediate for use in the preparation of other fluoro compounds such as $CH_3CF=CH_2$, and $CCl_3CFClCCl_3$, the latter in turn being especially desirable as a starting material for making highly fluorinated propanes such as $C_3F_7Cl$ and $C_3F_8$.

The compound 2,2-chlorofluoropropane has been prepared by reaction of $CH_3CCl_2CH_3$ and antimony trifluoride. However, the reaction is liquid phase, and results in the formation of only a small amount, e.g. less than 10% of 2,2-chlorofluoropropane. Such procedure affords no commercial potentialities.

An object of this invention is to provide commerically feasible, gas-phase methods for making 2,2-chlorofluoropropane in high yields.

In accordance with the invention, it has been found that when gaseous isopropyl fluoride and gaseous chlorine are reacted under certain actinic radiation conditions, 2,2-chlorofluoropropane is produced in readily recoverable form and at remarkably high yields. Isopropyl fluoride, $CH_3CHFCH_3$, normally a colorless gas and having a boiling point of about minus 9° C., is a well known and available compound. The invention involves the discovery of the adaptability of $CH_3CHFCH_3$ as a starting material, the effectiveness of actinic radiation for bringing about selective and limited chlorination of the isopropyl fluoride, and certain reaction conditions, all of which factors interdependently cooperate to constitute practicable and easily controllable gas phase methods for making 2,2-chlorofluoropropane.

Reactions involved in practice of the invention are thought to be along the lines of

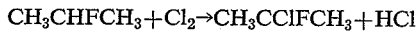
$CH_3CHFCH_3 + Cl_2 \rightarrow CH_3CClFCH_3 + HCl$

General practice of the invention comprises introducing gaseous $CH_3CHFCH_3$ and gaseous chlorine into a reaction zone, subjecting the material in such zone to actinic radiation, while maintaining temperature in such zone below certain maximums but high enough to retain all material in the zone in gas phase, to effect reaction of $CH_3CHFCH_3$ and elemental chlorine to form $CH_3CClFCH_3$, and discharging from the reaction zone gaseous reaction products containing $CH_3CClFCH_3$.

Appropriate apparatus may comprise an elongated tubular reactor provided at one end with valved inlets for metered charging of incoming gaseous $CH_3CHFCH_3$ and incoming gaseous chlorine, and at the other end with a gas outlet communicating with the inlet of a cold trap associated with refrigerating equipment to maintain the trap at a temperature sufficiently low to effect condensation of all the reaction zone exits with the exception of hydrogen chloride. Low temperature in the trap may be maintained conveniently at about minus 78° C. by a Dry Ice-acetone mixture. Recovery of sought-for product and other reaction zone exits may be more or less conventional as known in this art. If desired the apparatus train between the reactor and the cold trap may include a water scrubber to remove HCl, a caustic scrubber to recover excess chlorine, and e.g. a calcium chloride drying tower the gas outlet of which is connected to the gas inlet of the cold trap. The trap is usually provided with a gas vent to permit passage thru the trap of HCl or other non-condensables, and may include other valved outlets thru which during a continuous reaction run, liquid condensate may be drawn off to a fractionator, or, following a reaction run, the condensate may be fractionated off to recover $CH_3CClFCH_3$ to separate the same from other materials. Apparatus other than the reactor may be made of any suitable material, such as nickel, Monel, Inconel and steel, which is corrosive-resistant to reactants and products and by-products involved. The tubular reactor may be equipped with any suitable cooling means to maintain in the reaction zone the hereindescribed reaction temperature conditions. For example, the reactor may be provided with an axially disposed, water-fed, internal cooling coil. The reactor proper may be of any transparent composition which permits exposure of the reactants therein to the action of actinic radiation. Suitable materials of reactor construction are Pyrex glass, quartz, Vycor, polytetrafluoroethylene, polychlorotrifluoroethylene, or other transparent inert fluorocarbon polymer. Further, the reactor may be a metal tube, arranged for external temperature control, and having a centrally disposed tubular light source of glass wihch may be coated with transparent fluorocarbon resin.

Actinic radiation techniques in general, such as selection of composition of the reactor and selection of suitable sources of light are well known. Any form of light which effects chemical reaction may be employed. Moderately strong daylight is operative, but not preferred. More desirably, light utilized is such as that obtained from high or low-pressure mercury vapor lamps, ordinary incandescent or fluorescent lamps, and ultra-violet fluorescent or white light.

Affording a notable advantage of the invention, it has been found that isopropyl fluoride and chlorine may be reacted when subjected to the action of actinic radiation at relatively low temperatures. Isopropyl flouride and chlorine are usually available as gases. In practice, there appears to be no critical lower temperature limit as long as incoming reactants are in the gas phase and, considering temperature and residence time of material in the reaction zone, reaction zone temperatures are high enough to maintain all material therein in the gas phase. Reaction zone temperature (substantially atmospheric pressure) below about 10° C. is not preferred, and ordinarily reaction zone temperature is held not lower than about 15° C. Reaction zone temperature above about 150° C. is undesirable since higher temperatures notably enhance over-chlorination, pyrolysis and disproportionation of the 2,2-chlorofluoropropane end product. To minimize over-chlorination and disproportionation, reaction zone temperatures are ordinarily held not in excess of about 100° C., and preferred operating temperatures are substantially in the range of 15-75° C.

With regard to molar proportions of organic starting material and chlorine, while possible to operate using from about 0.1 mol to the economic limit of chlorine per mol of $CH_3CHFCH_3$, it has been found that in carrying out the reactions described, particularly in the interest of minimizing over-chlorination, it is preferred to employ molecular proportions of one mol of $CH_3CHFCH_3$ organic starting material to not more than about one mol of chlorine. For best operation, mol proportions of $CH_3CHFCH_3$ and chlorine fed to the reaction zone are substantially in the range of 0.5–1.0 mol of chlorine per mol of $CH_3CHFCH_3$.

It has been found that to effect formation of $CH_3CClFCH_3$, the isopropyl fluoric and chlorine should be subjected to actinic radiation, in the range of 2000–5000 Anstrom units and preferably supplied by an artificial light source, i.e. other than daylight. Hence, in order to effectuate the stated degree or wave length of radiation, the controlling variables, such as composition of the reactor shell if transparent, type of light used, intensity of light, and residence time of reactant materials in the reactor, may be chosen and adjusted accordingly within the skill of known actinic radiation techniques.

Residence time of reactants in the reactor is moderately variable, and is related mostly to other major variables such as design of the reactor, type and intensity of light. It will be understood that for say a Pyrex glass reactor and a relatively low wattage incandescent light, residence time of necessity is substantially higher than in the case of say a Pyrex reactor and an ultraviolet lamp of several hundred watts intensity. However, optimum residence time is the most easily regulated variable and hence, depending upon particular apparatus available, may be determined by a test run or two. While residence or contact time may vary in the range of 0.5–200 seconds, residence time of not less than 5 seconds is preferred. In general, working with reasonably satisfactory equipment, residence time is ordinarily in the range of 5 to 60 seconds. Pressure is preferably about atmospheric, although pressure may be above or below atmospheric to no particular advantage.

The following examples illustrate practice of the invention. The reactor employed was a Pyrex tube, 1.5″ I.D. and 16″ long, providing a reaction zone having at one end inlets for regulated introduction of gaseous $$CH_3CHFCH_3$$

and gaseous chlorine respectively, and at the other end a gas outlet. The reactor was equipped with an axially disposed, water-fed, internal cooling coil of length substantially the same as that of the reaction zone. In Example 1, actinic radiation was supplied by moderately strong daylight, and in Examples 2 and 3, radiation was effected by a 20-watt fluorescent light about 30″ long arranged so that the axes of the reactor and of the light bulb were approximately parallel but spaced apart about 2 to 3 inches, thus supplying actinic radiation of wave length of about 2000 to 5000 Angstrom units. Percent conversion (molar basis) indicated below is equal to mols of organic starting material consumed divided by mols of organic starting material fed multiplied by 100. Percent yield (molar basis) equals mols of sought for product recovered divided by mols of organic starting material consumed multiplied by 100.

*Example I.*—Over a period of about 8.5 hrs. about 337 g. (5.45 mols) of gaseous $CH_3CHFCH_3$, and about 305 g. (4.3 mols) of $Cl_2$ were fed continuously into the reactor. Mol ratio of chlorine to $CH_3CHFCH_3$ was about 0.78:1. Water flow through the cooling coil was regulated so that the internal temperature in the reactor was maintained at about 25° C. Rates of feed of incoming reactants, which consisted only of $CH_3CHFCH_3$ and chlorine, were such that residence time in the reactor was about 18 seconds. Reaction products exiting the reactor were first washed with water to remove HCl, then with aqueous sodium hydroxide to recover excess chlorine, dried with calcium chloride, and finally condensed in a cold trap at temperature of about minus 78° C. maintained by Dry Ice-acetone mixture. About 32 g. of $Cl_2$ were recovered in the caustic trap. In the cold trap, there were recovered about 461 g. of condensate. On fractionation of the latter, there were obtained about 99 g. (1.6 mols) of unreacted $CH_3CHFCH_3$, B.P. minus 9° C.; about 285 g. (2.96 mols) of material shown by infrared analysis to be product $CH_3CClFCH_3$, B.P. 35.2° C.; and about 33 g. (0.34 mol) of $CH_3CHFCH_2Cl$, B.P. 68° C. Conversion of organic starting material to other products was about 70%, and yield of sought for $CH_3CClFCH_3$ on the basis of starting material consumed was about 77%.

*Example II.*—The reactor employed was the same as in Example I, and actinic radiation was supplied by fluorescent light as above indicated. In this run, about 492 g. (8.0 mols) of $CH_3CHFCH_3$ and about 535 g. (7.5 mols) of chlorine were fed continuously to the reactor over a period of about 8 hours. Mol ratio of chlorine to organic starting material was about 0.93. Water flow through the cooling coil was regulated to maintain a reaction temperature in the reaction zone of about 50° C. The rate of feed of reactants was adjusted so that residence time in the reactor was about 8 seconds. Reaction products exiting the reactor were condensed in a Dry Ice-acetone trap, the HCl exit of which was absorbed in the water scrubber. In the cold trap, there were recovered about 790 g. of condensate. On fractionation of the latter, there were obtained about 40 g. (0.65 mol) of unreacted $CH_3CHFCH_3$; about 574 g. (6.0 mols) of product $CH_3CClFCH_3$; about 55 g. (0.52 mol) of $$CH_3CHFCH_2Cl$$

and about 119 g. (0.94 mol) of $CH_3CClFCH_2Cl$, B.P. 88.5° C. Conversion of organic starting material and yield of sought for $CH_3CClFCH_3$, on the same basis as above, were respectively about 92% and 81%.

*Example III.*—Apparatus and actinic radiation were substantially the same as in Example II. During a period of about 5.75 hrs., about 538 g. (8.7 mols) of $CH_3CHFCH_3$, and about 4.95 g. (7.0 mols) of chlorine were continuously fed into the reactor at a rate such that residence time of reactants therein was about 8 seconds. Mol ratio of chlorine to $CH_3CHFCH_3$ was about 0.8:1. Water flow through the cooling coil was controlled so that temperature of about 20° C. was maintained in the reactor. In the cold trap, there were recovered about 746 g. of condensate. On fractionation of the latter, there were obtained about 130 g. (2.1 mols) of unreacted $CH_3CHFCH_3$, about 513 g. (5.4 mols) of sought for $CH_3CClFCH_3$; about 68 g. (0.81 mol) of $CH_3CHFCH_2Cl$; and about 35 g. (0.19 mol) of $CH_3CClFCH_2Cl$. Conversion of organic starting material $CH_3CHFCH_3$, and yield of $CH_3CClFCH_3$, on the same basis as above, were respectively 76% and 82%.

We claim:
1. The process for making 2,2-chlorofluoropropane which comprises introducing gaseous $CH_3CHFCH_3$ and gaseous chlorine into a reaction zone in proportions of one mol of $CH_3CHFCH_3$ to not more than about one mol of chlorine, subjecting the material in said zone to actinic radiation of wave length substantially in the range of 2000–5000 Angstrom units, while maintaining temperature in said zone below 100° C. but high enough to retain material in said zone in gas phase, to effect reaction of $CH_3CHFCH_3$ and chlorine to form $CH_3CClFCH_3$, discharging from said zone reaction products containing $CH_3CClFCH_3$, and recovering $CH_3CClFCH_3$.

2. The process of claim 1 in which temperature in said zone is substantially in the range of 15–75° C.; pressure is substantially atmospheric; residence time of reactants in said zone is substantially in the range of 5–60 seconds; and mol proportions of $CH_3CHFCH_3$ and chlorine fed to said zone are substantially in the range of 0.5–1.0 mol of chlorine per mol of $CH_3CHFCH_3$.

References Cited by the Examiner

UNITED STATES PATENTS 2,459,767   1/1949   Calfee et al. _____ 204—163

JOHN H. MACK, *Primary Examiner.*

JOHN R. SPECK, *Examiner.*

H. W. WILLIAMS, *Assistant Examiner.*